United States Patent
Liao

(10) Patent No.: US 9,226,016 B2
(45) Date of Patent: Dec. 29, 2015

(54) DIGITAL TELEVISION AND DIGITAL TELEVISION SYSTEM

(71) Applicant: HON HAI PRECISION INDUSTRY CO., LTD., New Taipei (TW)

(72) Inventor: Kuang-Yao Liao, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/476,954

(22) Filed: Sep. 4, 2014

(65) Prior Publication Data

US 2015/0062438 A1   Mar. 5, 2015

(30) Foreign Application Priority Data

Sep. 5, 2013   (TW) .............................. 102131916 A

(51) Int. Cl.
| | |
|---|---|
| H04N 5/63 | (2006.01) |
| H04N 5/44 | (2011.01) |
| H04N 21/426 | (2011.01) |
| H04N 7/20 | (2006.01) |
| H04N 21/436 | (2011.01) |
| H04N 21/61 | (2011.01) |

(52) U.S. Cl.
CPC ............ *H04N 21/4263* (2013.01); *H04N 7/20* (2013.01); *H04N 21/436* (2013.01); *H04N 21/6143* (2013.01)

(58) Field of Classification Search
CPC ....... H04N 5/4401; H04N 5/44; H04N 5/455; H04N 5/63; H04N 21/4263; H04N 21/42676; H04N 21/426
USPC .................................. 348/725–728, 730, 731
IPC .................................... H04N 5/44, 5/455, 5/63
See application file for complete search history.

(56) References Cited

U.S. PATENT DOCUMENTS

| | | | |
|---|---|---|---|
| 2009/0096934 A1* | 4/2009 | Nakajima et al. ............. | 348/725 |
| 2013/0083249 A1* | 4/2013 | Nonomura et al. ........... | 348/725 |
| 2014/0184921 A1* | 7/2014 | Sugiyama et al. ............ | 348/731 |

\* cited by examiner

*Primary Examiner* — Sherrie Hsia
(74) *Attorney, Agent, or Firm* — Novak Druce Connolly Bove + Quigg LLP

(57) ABSTRACT

A digital television includes a power line and a monitor. The power line includes a power connector, an electrical conductor, and a connector. The monitor includes a display module and a signal receiving module. The electrical conductor is used to supply power to the display module and the signal receiving module. The power line further comprises a transmitting module and an antenna conductor. The transmitting module is electrically connected to an external signal receiver to receive signal. The antenna conductor is connected to the transmitting module and the signal receiving module, whereby the signal received by the transmitting module is transmitted to the signal receiving module by the antenna conductor, and processed by the signal receiving module and transmitted to the display module. A digital television system is also provided.

16 Claims, 1 Drawing Sheet

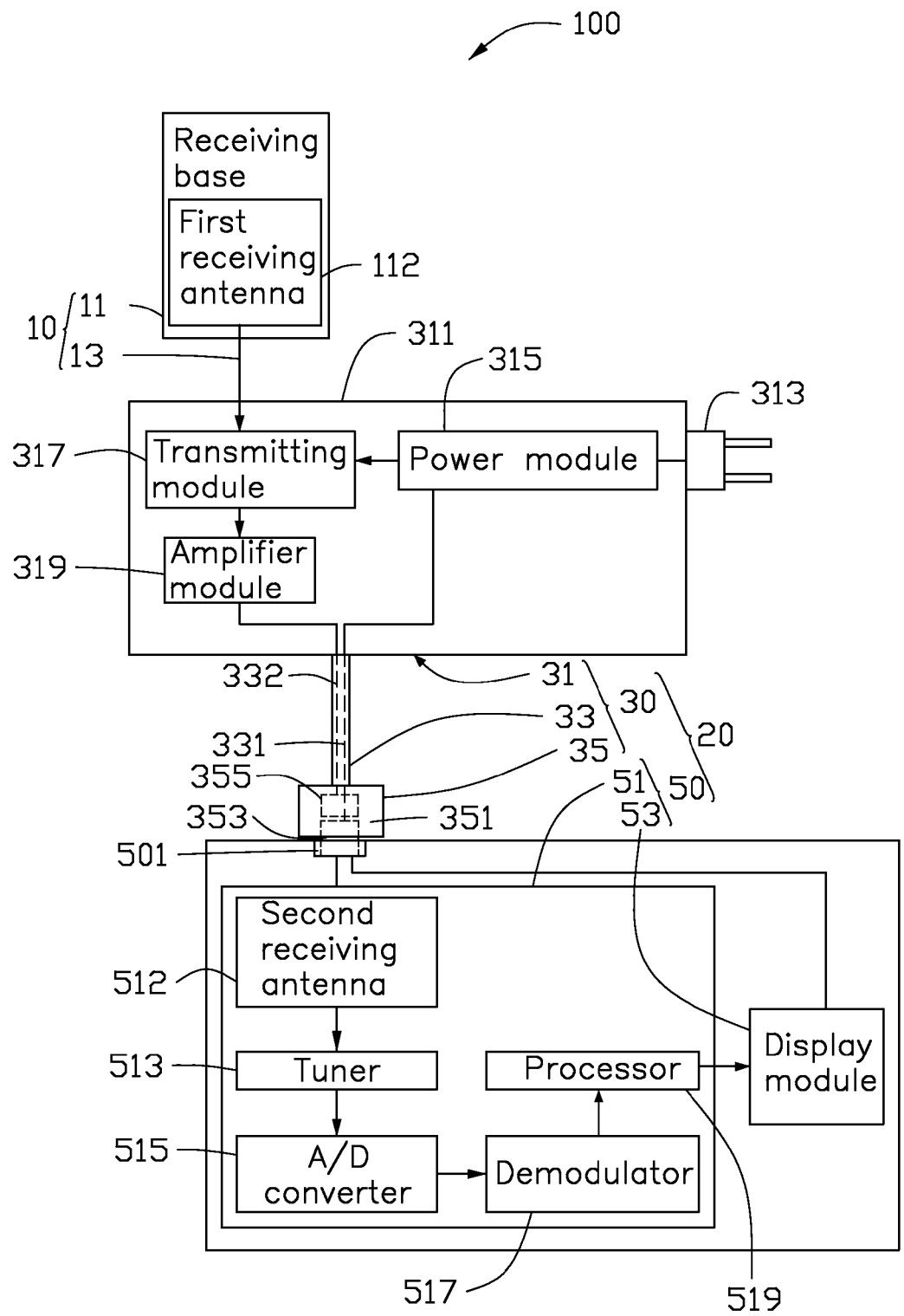

DIGITAL TELEVISION AND DIGITAL TELEVISION SYSTEM

FIELD

The subject matter herein generally relates to a digital television and a digital television system.

BACKGROUND

Digital television usually receives signal from the television stations by a set-top box. The set-top box is electrically connected to the digital television to transfer the signal to the digital television.

BRIEF DESCRIPTION OF THE DRAWINGS

Implementations of the present technology will now be described, by way of example only, with reference to the attached FIGURE.

The FIGURE is a block diagram of a television system of an embodiment of this disclosure.

DETAILED DESCRIPTION

Numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawing is not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is described in relation to a digital television system and a digital television.

FIG. 1 illustrates a digital television system 100 including a signal receiver 10 and a digital television 20. The signal receiver 10 can be positioned outdoors and electrically connected to the digital television 20. The signal receiver 10 can be used to transmit television signals to the digital television 20. The digital television 20 can include a power line 30 and a monitor 50.

The signal receiver 10 can be electrically connected to the power line 30, and include a receiving base 11 and a transmission wire 13 connected to the receiving base 11. The receiving base 11 can be positioned outdoors and has a first receiving antenna 112 therein. The first receiving antenna 112 can be used to receive television signals, such as the television signal from satellites. The transmission wire 13 can be connected to the first receiving antenna 112 and electrically connected to the power line 30. The signals received by the first antenna 112 can be transmitted to the power line 30 by the transmission wire 13.

The power line 30 can include a power connector 31, a connecting wire 33, and a connector 35. The power connector 31 and the connector 35 can be connected to the two ends of the connecting wire 33. The power connector 31 can be electrically connected to an external power source (not shown), and the connector 35 can be electrically connected to the monitor 50.

The power connector 31 can include a main body 311 and a pins 313. The power connector 31 can further include a power module 315, a transmitting module 317, and an amplifier module 319 received in the main body 311. The power module 315 can be electrically connected to the transmitting module 317 and used to supply power to the transmitting module 317. The transmission wire 13 can be electrically connected to the transmitting module 317, whereby the signals received by the first receiving antenna 112 can be transmitted to the transmitting module 317 by the transmission wire 13. The transmitting module 317 can be electrically connected to the amplifier module 319, and transmit signals to the amplifier module 319. The amplifier module 319 can amplify the received signals. The pins 313 can be mounted on, and partially protrude out of the main body 311, and electrically connected to the power module 315. The pins 313 can be coupled to an external power socket (not shown) to transmit power from the external power to the power module 315.

The connecting wire 33 can include an electrical conductor 331 and an antenna conductor 332 therein. One end of the electrical conductor 331 can be connected to the power module 315, and the other end can be connected to the connector 35. The electrical conductor 331 can be used to transmit the electric energy of the power module 315 to the connector 35. One end of the antenna conductor 332 can be connected to the amplifier module 319, and the other end can be connected to the connector 35. The antenna conductor 332 can be used to transmit the signals after enlargement to the connector 35.

In at least one embodiment, the connector 35 can be coupled to the monitor 50 and include a base 351 and a joint member 353. The electrical conductor 331 can be partially mounted in the base 351. The base 351 can include a sensing antenna 355 therein. In at least one embodiment, the sensing antenna 355 can be annular. The sensing antenna 355 can be connected to the antenna conductor 332 and positioned near the joint member 353. The sensing antenna 355 can be used to send the signals to the monitor 50. The joint member 353 can extend out of the base 351 and electrically connected to the monitor 50. One end of the joint member 353 away from the monitor 50 can be connected to the electrical conductor 331, and the electric energy of the power module 315 can be transmitted to the monitor 50 through the electrical conductor 331 and the joint member 353. When the joint member 353 supplies power to the monitor 50, the sensing antenna 355 can directly send signals to the monitor 50.

The monitor 50 can further include a power interface 501, a signal receiving module 51 and a display module 53. The monitor 50 can further include other elements, such as a backlight module. The power interface 501 can be coupled to connector 35 and connected to the signal receiving module 51 and the display module 53, configured to supply power to the signal receiving module 51 and the display module 53. The signal receiving module 51 can include a second receiving antenna 512, a tuner 513, an analog-to-digital (A/D) converter 515, a demodulator 517, and a processor 519 connected in order. The second receiving antenna 512 can be positioned near the power interface 501 and connected to a set-top box (not shown). Therefore, the second receiving antenna 512 can receive the signals from the set-top box and the sensing antenna 355 at the same time. Even though the set-top box is broken, the monitor 50 can still receive signals from the sensing antenna 355. The second receiving antenna 512 can transmit signals to the tuner 513, and the tuner 513 can tune and transmit the signals to the A/D converter 515. The A/D converter 515 can convert the analog signal output by the tuner 513 to the digital signal and transmit the signal to the demodulator 517. The demodulator 517 can demodulate the signal and send a TS (Transport Stream) flow signal to the processor 519. The display module 53 can be connected to the processor 519, and the TS flow signal can be converted to RGB data and output to the display module 53. The display module 53 can display high-quality image.

In operation, the receiving base 11 of the outer signal receiver 10 can be positioned outdoors, and the transmission wire 13 can be inserted in the power line 30. The pins 313 can then by inserted in the power socket, and the connector 35 can be inserted in the power interface 501 of the monitor 50. The pins 313 can get electric energy from the outer power source, and transmit the electric energy to the power module 315. The electric energy can be transmitted to the signal receiving module 51 and the display module 53 by the electrical conductor 331 and the connector 35. The first receiving antenna 112 can receive the external television signal, and transmit the signal to the transmitting module 317 by the transmission wire 13. The signal can be transmitted to the amplifier module 319 by the transmitting module 317, and then amplified and transmitted to the sensing antenna 355 by the antenna conductor 332 of the transmission line 33. The second receiving antenna 512 can receive the signal from TV stations and the signal from the sensing antenna 355, and transmit the signal to the tuner 513. Then, the signal can be tuned by the tuner 513 and transmitted to the A/D converter 515. The A/D converter 515 can convert the analog signal output by the tuner 513 to the digital signal and transmit the signal to the demodulator 517. The demodulator 517 can demodulate the signal and output the TS flow signal to the processor 519. The display module 53 can be connected to the processor 519, and the TS flow signal can be converted to RGB data and output to the display module 53. The display module 53 can display high-quality image, and users can watch TV programmes.

The power line 30 of the digital television 20 can include the transmitting module 317 and the antenna conductor 332. The signal receiver 10 can be positioned outdoors and connected to the power line 30, and include the first receiving antenna 112 which can receive TV signal and transmit the signal to the transmitting module 317. One end of the antenna conductor 332 can be connected to the transmitting module 317, and the other end can be connected to the signal receiving module 51, thus the signal received by the transmitting module 317 can be transmitted to the second receiving antenna 512 by the antenna conductor 332. Therefore, the second receiving antenna 512 can receive the signal transmitted by the set-top box and the sensing antenna 355 at the same time. If the set-top box is broken or the signal indoors is weak, the digital television 20 can still display TV programmes as the sensing antenna 355 can transmit signal.

In other embodiments, the amplifier module 319 can be omitted, and the first receiving antenna 112 can be directly connected to the transmission wire 13. The electrical conductor 331 and the antenna conductor 332 can be more than one. The connector 35 and the sensing antenna 355 can also be omitted. One end of the antenna conductor 332 can be connected to the transmitting module 317, and the other end can be connected to the second receiving antenna 512, whereby signal received by the transmitting module 317 can be transmitted to the receiving module 51 by the antenna conductive wire 332.

The embodiments shown and described above are only examples. Many details are often found in the art such as the other features of a digital television system and a digital television. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, comprising matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A digital television comprising:
    a power line having a power module and an electrical conductor connected to the power module, and
    a monitor having a display module and a signal receiving module electrically connected to the display module;
    wherein, the electrical conductor is electrically connected to the display module and the signal receiving module and used to supply power to the display module and the signal receiving module;
    wherein, the power line further comprises a transmitting module and an antenna conductor;
    wherein, the transmitting module is electrically connected to an external signal receiver to receive signal;
    wherein, one end of the antenna conductor is connected to the transmitting module, and the other end of the antenna conductor is connected to the signal receiving module, whereby the signal received by the transmitting module is transmitted to the signal receiving module by the antenna conductor, then processed by the signal receiving module and transmitted to the display module.

2. The digital television as claimed in claim 1, wherein the power line further comprises an amplifier module; the transmitting module is electrically connected to the antenna conductor through the amplifier module and transmits the signal to the amplifier module; the amplifier module is used to amplify the signal and transmit the signal to the signal receiving module through the antenna conductor.

3. The digital television as claimed in claim 2, wherein the power line further comprises a connector including a base and a joint member assembled in the base.

4. The digital television as claimed in claim 3, wherein the base includes a sensing antenna therein; the antenna conductor is partially assembled in the base and electrically connected to the sensing antenna; the sensing antenna is used to transmit the signal to the signal receiving module.

5. The digital television as claimed in claim 4, wherein the sensing antenna is annular.

6. The digital television as claimed in claim 3, wherein the joint member is electrically connected to the electrical conductor and the monitor, whereby the electrical conductor is electrically connected to the signal receiving module and the display module.

7. A digital television system comprising:
a digital television, having a display module and a signal receiving module;
a power line having a power module, a transmitting module and an antenna conductor; and
a signal receiver for receiving an external television signal;
wherein, the power module of the power line is connectable to an external power source and is electrically connected to, and provides power to, the signal receiving module and the display module;
wherein, the signal receiver is electrically connected to the transmitting module and the transmitting module is connected to the signal receiving module by the antenna conductor;
wherein, a signal received by the signal receiver is transmitted to transmitting module, then transmitted to the signal receiving module by the antenna conductor, processed by the signal receiving module and transmitted to the display module.

8. The digital television system as claimed in claim 7, wherein the power line further comprises an electrical conductor; the electrical conductor is electrically connected to the display module and the signal receiving module and used to supply power to the display module and the signal receiving module.

9. The digital television system as claimed in claim 7, wherein the signal receiver comprises a receiving base and a transmission wire connected to the receiving base.

10. The digital television system as claimed in claim 9, wherein the receiving base comprises a first receiving antenna used to receive external television signal.

11. The digital television system as claimed in claim 10, wherein the transmission wire is connected to the first receiving antenna and electrically connected to the transmitting module, whereby the signal received by the first receiving antenna is transmitted to the transmitting module by the transmission wire.

12. The digital television system as claimed in claim 7, wherein the power line further comprises an amplifier module; the transmitting module is electrically connected to the antenna conductor through the amplifier module and transmits the signal to the amplifier module; the amplifier module is used to amplify the signal and transmit the signal to the signal receiving module through the antenna conductor.

13. The digital television system as claimed in claim 7, wherein the power line further comprises a connector including a base and a joint member assembled in the base.

14. The digital television system as claimed in claim 13, wherein the base includes a sensing antenna therein; the sensing antenna is used to transmit the signal to the signal receiving module.

15. The digital television system as claimed in claim 14, wherein the sensing antenna is annular.

16. The digital television system as claimed in claim 7, wherein the signal receiving module comprises a second receiving antenna, a tuner, an analog-to-digital converter, a demodulator, and a processor connected in order; the signal received by the first receiving antenna is transmitted to the signal received by the transmitting module is transmitted to the second receiving antenna of the signal receiving module.

* * * * *